(12) United States Patent
Campbell

(10) Patent No.: US 6,775,123 B1
(45) Date of Patent: Aug. 10, 2004

(54) CYLINDRICAL ASYMMETRICAL CAPACITOR DEVICES FOR SPACE APPLICATIONS

(75) Inventor: Jonathan W. Campbell, Harvest, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/446,282
(22) Filed: May 27, 2003
(51) Int. Cl.[7] .............................................. H01G 4/228
(52) U.S. Cl. ..................................... 361/306.1; 361/811
(58) Field of Search ............................. 361/306.1, 311, 361/15, 16, 17, 715, 821, 811

(56) References Cited

U.S. PATENT DOCUMENTS 6,317,310 B1 * 11/2001 Campbell ................. 361/306.1
6,411,493 B2 * 6/2002 Campbell ................. 361/306.1

* cited by examiner

Primary Examiner—Anthony Dinkins
(74) Attorney, Agent, or Firm—James J. McGroary; Ross R. Hunt, Jr.

(57) ABSTRACT

An asymmetrical capacitor system is provided which creates a thrust force. The system is adapted for use in space applications and includes a capacitor device provided with a first conductive element and a second conductive element axially spaced from the first conductive element and of smaller axial extent. A shroud supplied with gas surrounds the capacitor device. The second conductive element can be a wire ring or mesh mounted on dielectric support posts affixed to a dielectric member which separates the conductive elements or a wire or mesh annulus surrounding a barrel-shaped dielectric member on which the first element is also mounted. A high voltage source is connected across the conductive elements and applies a high voltage to the conductive elements of sufficient value to create a thrust force on the system inducing movement thereof.

30 Claims, 3 Drawing Sheets

CYLINDRICAL ASYMMETRICAL CAPACITOR DEVICES FOR SPACE APPLICATIONS

ORIGIN OF THE INVENTION

This invention was made by an employee of the United States Government and may be manufactured and used by or for the Government for Governmental purposes without the payment of royalties.

BACKGROUND OF THE INVENTION

1. Field of Invention

The present invention relates to barrel-shaped asymmetrical capacitor devices that are charged to high potentials for generating thrust and, more particularly, to improved devices of this kind that are particularly adapted for space use. The present invention originated the label "asymmetrical capacitor" to describe these devices.

2. Background of the Invention

As disclosed in my earlier filed applications, Ser. No. 09/520,817, filed on Mar. 8, 2000, and now U.S. Pat. No. 6,317,310, and Ser. No. 09/961,552, filed on Sep. 20, 2001, and now U.S. Pat. No. 6,411,493, both of which are hereby incorporated by reference in their entirety, it is well established in the literature that a force or thrust may be generated by a capacitor charged to a high potential. The public domain literature information and data base from which these patents are solely and entirely derived includes only extensive NASA electric propulsion information, extensive Air Force electric propulsion information, the many public domain works of Thomas Townsend-Brown, the general requirements and constraints for Aerospace applications, and the laws of physics. With regard to the latter, the devices referred to here obey the law of conservation of momentum and Newton's laws and a correctly formulated magneto-hydrodynamic (MHD) description is expected to be completely sufficient and adequate to describe the performance and all other aspects of these devices. The MHD nature of the devices has been proven experimentally in a number of different ways including the discovery of Trichel pulse emanation during operation. With regard to Thomas Townsend-Brown, public domain examples include a British patent entitled "A Method of and an Apparatus or Machine for Producing Force", No. 21,452/26 (300,311) dated Nov. 15, 1928, and U.S. Pat. No. 2,949,550, "Electrokinetic Apparatus" dated Aug. 16,1960.

Although there are different theories regarding the basis for this phenomenon, there is no dispute that a force is generated in air by asymmetric capacitors under sufficiently high voltages without the need for onboard propellant or moving parts.

In the patents referred to above, asymmetrical capacitor systems are disclosed for creating thrust, the-system basically comprising a capacitor module comprising a first conductive element having a barrel shaped geometry; a second conductive element axially spaced from the first conductive element and of a geometry having a smaller axial extent than the first conductive element; and a dielectric element (or elements) disposed between the first conductive element and the second conductive element so as to form the capacitor module; and, a high voltage source, having first and second terminals connected respectively to the first and second conductive elements, for applying a high voltage to the conductive elements of sufficient value to create a thrust force on said module inducing movement thereof. A number of different embodiments are disclosed in these patents and, for example, the first conductive element can comprise a solid cylinder or a hollow cylinder, the second conductive element can comprise a disk, a domed element, or a tip at the end of a dielectric rod, and the system may further include a plurality of circumferentially disposed, spaced dielectric rods interconnect the dielectric element and the second conductive element.

An asymmetrical capacitor device as described above has been extensively tested and "proof of principles" operation thereof has been established in the laboratory at one atmosphere. More specifically, the placing of a high voltage across the asymmetrical capacitor device in air has resulted in a force being generated, i.e., the device has been found to convert electrical energy (supplied by the high voltage source) into a consistent force acting on the capacitor. Further, if the capacitor device is attached to a rotor, or other movable platform, the reactive force may be used to move the platform. Among other advantages of such devices is that no moving parts, as such, are required.

Although, as discussed above, there is some disagreement as to the theory of operation of such a device, it appears from the extensive theoretical and experimental work that has been carried out by the inventor that the air provides molecules for ionization by the capacitor (i.e., molecular and atomic ions are created. These ions are subsequently accelerated by the capacitor's fields and then collide with neutrals transferring momentum to provide thrust.

SUMMARY OF THE INVENTION

The systems and devices disclosed in the above-identified patents are attractive potential candidates for use in space. In this regard, the electrical nature of the device, i.e., the fact that energy is input from an electrical source and is converted into kinetic energy with no moving parts, would appear to make the device especially useful in a space application wherein electrical energy is readily available (e.g., applications involving beamed power, solar arrays, nuclear sources, antimatter generators (when available), or combinations thereof). Potential applications envisioned include attitude control for satellites; the deflection of near Earth objects (NEO's) such as asteroids, meteoroids, and comets from striking the Earth; deep space transportation missions; and any others requiring relatively low thrust. However, because it has been established through extensive experimentation that air or a similarly appropriate gas is required in order for the patented devices to effectively operate in vacuum, an important aspect of the present invention is that it effectively overcomes this problem so that an asymmetric capacitor device is provided which is useful for space applications.

In accordance with a first aspect of the invention, there is provided an asymmetrical capacitor system for creating a thrust in a vacuum, the system comprising:

a capacitor device comprising a first conductive element having a first geometry and forming a cathode; a second conductive element axially spaced from said first conductive element, having a geometry of smaller axial extent than said first conductive element and forming an anode; and a dielectric element disposed between said first conductive element and said second conductive element so as to form an asymmetrical capacitor having an anode end and a cathode end;

a high voltage source, having first and second terminals connected respectively to said first and second conductive elements, for applying a high voltage to said conductive elements of sufficient value to create a thrust force on said capacitor device inducing movement thereof;

a shroud surrounding at least said anode and having a closed end at least at said anode end of said asymmetrical capacitor; and a gas supply for supplying gas to said shroud at said anode end.

Preferably, the shroud is affixed to said capacitor device for movement therewith.

In one important embodiment, the first conductive element comprises a hollow conductive cylinder. Advantageously, the cylinder comprises a metal sheet.

In an important implementation, the second conductive element comprises a fine conductive wire of an annular configuration. Advantageously, a plurality of dielectric posts support the conductive wire. In an alternative implementation, the second conductive element further comprises a plurality of diagonally extending wires extending between diametrically opposed points on said annular conductive wire and crossing at a central point to form a grid. In yet another important implementation, the second conductive element comprises a wire mesh grid. In one advantageous embodiment, the wire mesh grid is of a cylindrical geometry. In an alternative advantageous embodiment, the wire mesh grid is of a substantially flat geometry and has a circular perimeter.

In an important embodiment, the dielectric element comprises an elongated dielectric barrel, and the first and second conductive elements each comprise annular conductors disposed on the dielectric barrel in axially spaced relation. In one implementation, the second conductive element comprises a conductive mesh. In another implementation, the second conductive element comprises loops of fine wire. In yet another implementation, the second conductive element comprises a fine wire spiral. Preferably, the dielectric cylinder includes first and second axially spaced countersunk annular grooves in the outer surface thereof and the first and second conductive elements are disposed in these grooves. Advantageously, the first conductive element comprises a conductive sheet. Preferably, the opposite ends of said dielectric cylinder extend beyond the first and second conductive elements.

In another important embodiment, the system further comprises a plurality of circumferentially disposed, angularly spaced dielectric rods interconnecting the dielectric element and the second conductive element.

In an additional preferred embodiment, the second conductive element comprises a plurality of concentric conductive elements forming a plurality of concentric anodes. Advantageously, the dielectric element comprises a plurality of concentric dielectric cylinders and the plurality of concentric anodes are respectively supported by the plurality of dielectric cylinders.

In yet another preferred embodiment, the system includes a thruster including a nozzle, and the dielectric element and the shroud comprise part of the nozzle. Preferably, the nozzle includes a head portion, the anode-forming second conductive element is disposed within said head portion, and the gas supply supplies gas to said head portion. In an important implementation, the system further comprises an annular gas distribution member for receiving and distributing the gas, and the gas distribution member includes a rear gas flow opening. Preferably, the anode-forming second conductive element comprises an annular wire disposed with said annular gas distribution member and supported by at least one dielectric support post. In an alternative preferred embodiment, the anode-forming second conductive element comprises an annular conductive element secured to said annular gas distribution member adjacent to said rear opening, and the annular conductive element includes a sharp edge.

In accordance with a further aspect of the invention, there is provided an asymmetrical capacitor system for creating thrust, the system comprising:

an aerodynamically shaped member having a rounded leading edge and a tapered trailing edge and wherein at least an outer surface thereof comprises a dielectric, a capacitor device comprising a first conductive element disposed on the outer surface of said member and forming a cathode; a second conductive element disposed on the outer surface of said member in axially spaced relation to said first conductive element, having a geometry of smaller axial extent than said first conductive element and forming an anode wherein the first and second conductive elements together with said member form an asymmetrical capacitor; and a high voltage source, having first and second terminals connected respectively to said first and second conductive elements, for applying a high voltage to said conductive elements of sufficient value to create a thrust force on said capacitor device to thereby induce movement of said aerodynamically shaped member.

Further features and advantages of the present invention will be set forth in, or apparent from, the detailed description of preferred embodiments thereof which follows.

DESCRIPTION OF THE PREFERRED EMBODIMENTS

Before considering the invention in more detail, some background theoretical considerations with respect to the generation of thrust forces using asymmetrical capacitors will be examined.

Simplistically, neutral air molecules and atoms in the near vicinity of the capacitor are ionized by high potential and then accelerated by the electric field. Subsequent ion-neutral collisions collectively impart, in accordance with Newton's laws and the Conservation of Momentum, an equal and opposite force to the capacitor. In other words, the cumulative contributions of many of these ionization/acceleration/collision events at the molecular level results in a collective force or thrust being imparted to the capacitor. Given this explanation one would expect to see performance losses as the atmospheric density and pressure is reduced and indeed this is what we observe experimentally. In other words, my experimental observations are that reductions in pressure have substantially impacted the capacitor device performance described in my prior patents. Thrust is substantially and significantly reduced in vacuum.

Figure 1:
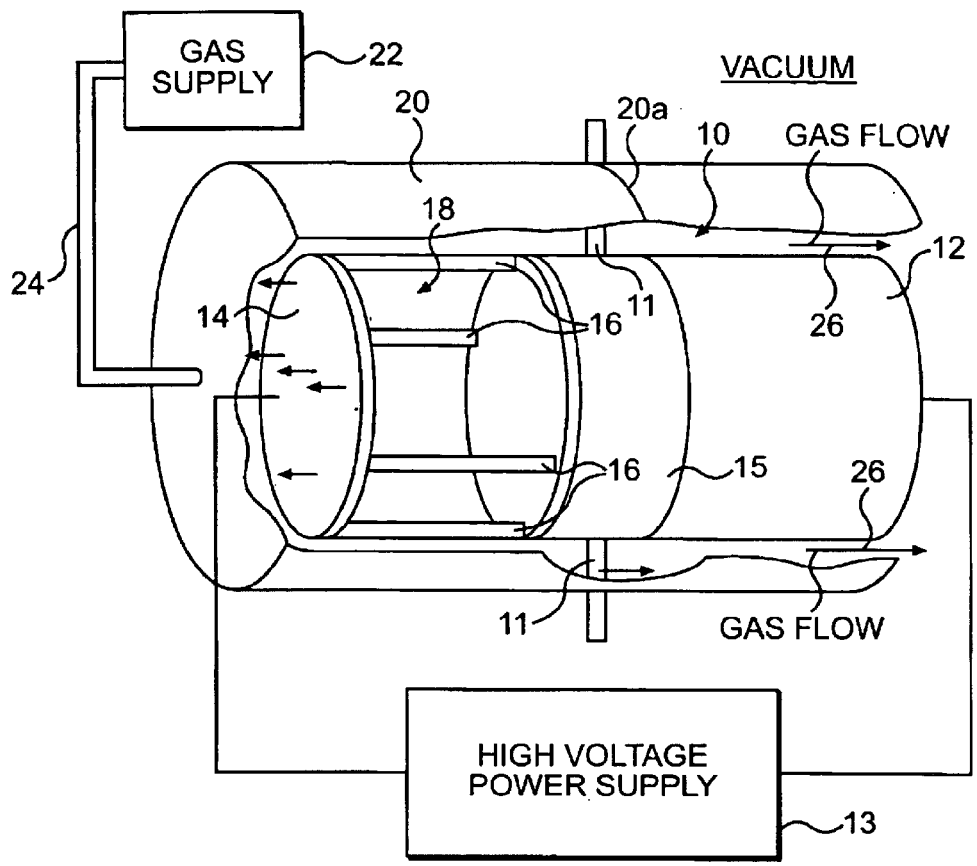
FIG. 1 is a perspective view, partially broken away, of an asymmetrical capacitor system in accordance with a first embodiment of the invention.

Referring to FIG. 1, there is shown a perspective view of a two dimensional, asymmetrical capacitor system in accordance with one embodiment of the invention. The system includes a capacitor unit or module 10 generally as described in my previous patents referenced above and including, at one end thereof, a barrel or cylinder 12 made of copper or another highly conductive material. The cylinder 12 can be solid or hollow. The module 10 also includes, axially spaced from cylinder 12 at the other end of module 10, a cylindrical disk 14 made of copper or another highly conductive material. In the embodiment of FIG. 1, a cylindrical dielectric element 15, which is made of Kapton or another high voltage dielectric material, is affixed to cylinder 12 on the side of cylinder 12 closest to the cylindrical disk 14. A plurality of dielectric rods or struts 16 are provided which join the disk 14 and the dielectric cylinder 15. The dielectric rods 16 are attached, at one end thereof, about the periphery of the dielectric cylinder 15. These dielectric rods 16 extend axially across the air gap 18 and are attached, at the other end thereof, to the disk 14. A support post 11 extends outwardly from the cylindrical dielectric element 15 on both sides thereof. Support post 11 is preferably made of Kapton or another high voltage dielectric substance. As described in my earlier patents a large number of different embodiments of the basic capacitor module are possible and additional embodiments are also discussed below.

A high voltage supply 13 is also provided. The high voltage supply 13 has first and second terminals respectively connected to the cylindrical disk 14 and the cylinder 12 which form the axial capacitor plates of the capacitor module 10. The voltage of the voltage supply 13 is such to charge the capacitor module 10 to a sufficiently high potential to cause a thrust or force to be generated which causes axial movement of the capacitor module 10.

In accordance with a first embodiment of the invention, a cylindrical dielectric shroud 20 is disposed around the module 10, and gas, preferably in the form of air, nitrogen, oxygen, argon or the like, is supplied to the anode end of module 10, i.e., in the vicinity of anode 14, from a gas supply 22 through a suitable gas connection indicated at 24. The gas flow within the shroud 20 is indicated schematically by arrows 26. The length of shroud 20 is a parameter that may be varied to provide optimum operation and, for example, shroud 20 may only extend to cathode 15 as indicated in dashed lines at 20a. The length of cathode 15 is another parameter that may be varied in seeking an optimal performance tradeoff between thrust and weight.

In operation, it is theorized that module 10 ionizes molecules and atoms in the gas flow and provides acceleration thereof, thereby producing thrust. Experimentation has shown that thrust may be initiated at voltages as low as 8 kV for air. Other gases may allow this threshold to be varied. Because thrust levels are directly proportional to the voltage across the capacitor device 10, the thrust levels produced by the device may also be varied by changing the voltage, e.g., through the use of a variable voltage supply as voltage supply 13. Varying the gas flow may also be a way of varying the thrust level.

The thrust produced increases with voltage until sparking threshold is reached. The aforementioned U.S. Pat. No. 6,411,493 B2 discloses various methods for combating sparking. Operating at voltages below the sparking threshold increases the lifetime of the device.

Figure 2:
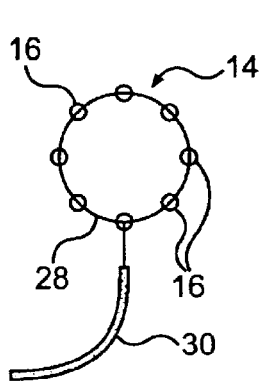
FIG. 2 is an end elevational view of a first alternative embodiment of the anode assembly of the asymmetrical capacitor system of FIG. 1.

Referring to FIG. 2, there is shown a first important alternative embodiment of the anode configuration. In this embodiment, anode 14 is formed by a circular conducting wire 28 supported by a plurality of dielectric posts 16 generally corresponding to those described above in connection with FIG. 1. A connecting wire is indicated at 30. The conducting wire 28 is preferably made as fine as possible to be consistent with the requirements with respect to operational strength. Preferably, wire 28 is affixed to posts 16 by corresponding needles or screws embedded in each post 16 so as to permit attachment of wire 28. Two approaches that may be used are silver soldering and spot welding although, in general, any approach that preserves the electrical conductivity of the wire should be acceptable. Moreover, it is not necessary that the points of attachment of wire 28 to the respective support posts 16 be conductive, although this construction is presently preferred because of the convenience thereof.

Figure 3:
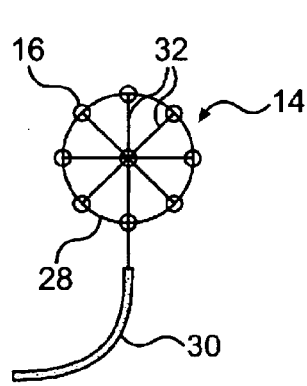
FIG. 3 is an end elevational view of a further alternative embodiment of the anode assembly of the asymmetrical capacitor system of FIG. 1.
Figure 4:
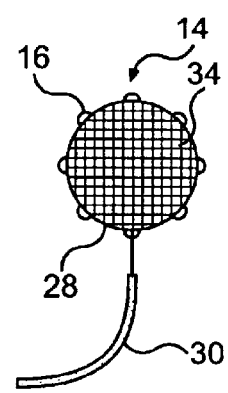
FIG. 4 is an end elevational view of yet another alternative embodiment of the anode assembly of the asymmetrical capacitor system of FIG. 1.

Referring to FIGS. 3 and 4, further preferred anode configurations are shown. In both embodiments, a fine grid is used to increase the ionization rates of impinging neutral particles. In FIG. 3, the grid is formed by fine diagonal wires 32 which interconnect opposite sides of wire 28 and which provide a spoke-like configuration a shown. In the embodiment of FIG. 4, a central fine mesh grid 34 is supported by wire 28.

Figure 5:
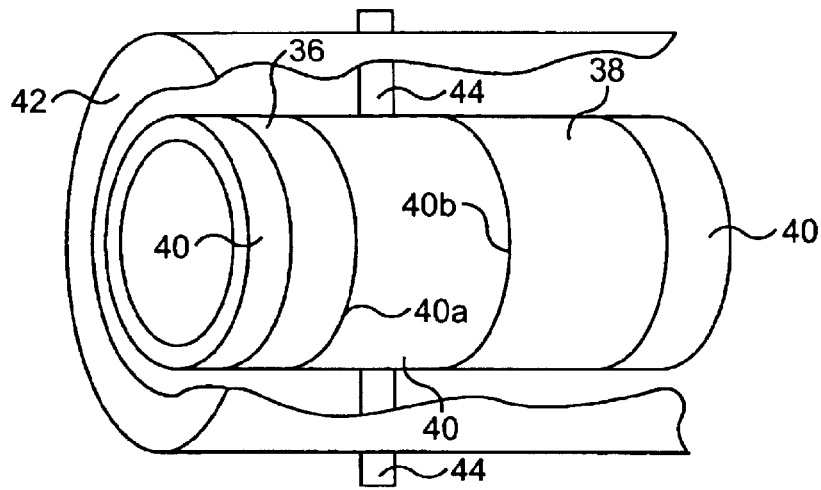
FIG. 5 is a perspective view, partially broken away, of an asymmetrical capacitor system in accordance with another embodiment of the invention.

Referring to FIG. 5, a further embodiment of the invention is shown. In this embodiment, a front conductive surface serving as an anode 36 and a rear conducting surface serving as a cathode 38 are formed on a hollow dielectric sleeve or cylinder 40. As shown, cylinder 40 preferably extends outwardly at both ends well beyond anode 36 and cathode 38. This approach enables the complete asymmetrical capacitor to be built on a single cylindrical surface. An outer shroud 42 is provided as in FIG. 1 and is similarly adapted to be connected to a gas supply (not shown) so that gas is provided to the anode end for partial ionization to provide thrust. Similarly, a pair of oppositely directed support elements 44 is also provided.

Anode 36 can comprise a wire spiral, a wire mesh or loops of fine wire fitted in and connected into a countersunk groove 40a in cylinder 40 so as to improve arcing resistance. A mesh anode tends to improve performance by increasing anode corona. Cathode 38 is preferably formed by a sheet conductor fitted to and connected into a countersunk groove 40b in dielectric cylinder 40 to improve arcing resistance.

Figure 6:
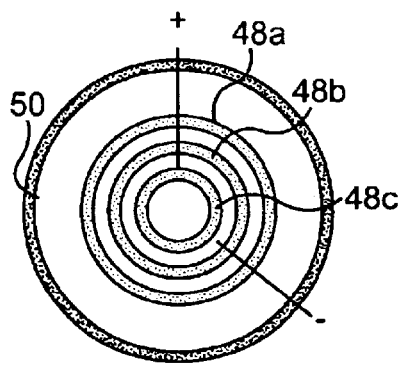
FIG. 6 is an end elevational view of a further embodiment of the invention.

Referring to FIG. 6, a further embodiment of the invention is shown wherein a concentric cylindrical configuration is provided. As shown in the front-end elevational view of FIG. 6, three wire anodes 48a, 48b and 48c are arranged in concentric relationship, although it will be understood that the number of anode wires can vary, within practical limits, from 1 to n. Multiple cylindrical shells may be built up as required for additional thrust. Increasing the number of anode wires and shells tends to increase the thrust. As in the previous embodiments, the device also includes a dielectric shroud 50 which is provided with gas to allow operation in vacuum, although this device can also be used on the ground in air.

Figure 7:
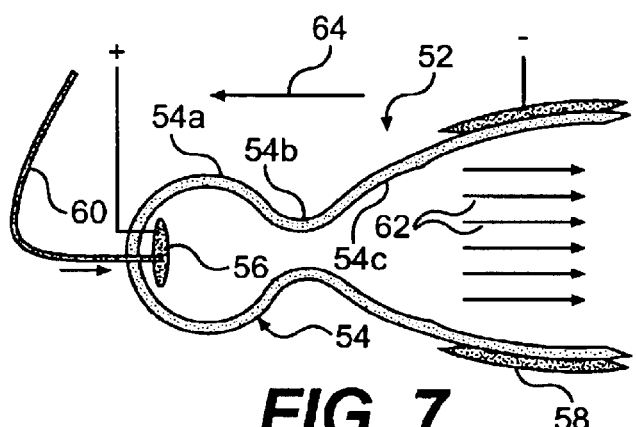
FIG. 7 is a side elevational view, partially in section, of an asymmetrical capacitor system according to yet another embodiment of the invention.

Referring to FIG. 7, yet another embodiment of the invention is shown wherein the device is of an enclosed anode hybrid thruster configuration. In other words, the asymmetrical capacitor effect is combined with a converging/diverging nozzle effect to produce a combined variable thrust effect in space. Thus, in FIG. 1, the thruster device, which is generally denoted 52, includes a nozzle 54 of a converging/diverging shape including a head portion 54a in which an anode assembly 56 is disposed, a neck or converging portion 54b and a diverging portion 54c on which a cathode 58 is disposed. Gas is supplied to the anode end or head portion 54a through a gas line 60 to create the gas flow indicated by arrows 62. Thrust is exerted in the opposite direction as indicated by arrow 64.

It will be appreciated that other nozzle geometries can be used and that these geometries can be optimized to achieve the optimum performance from the combined effects. This embodiment is also applicable to ground use in air.

Cathode 58 of thruster device 50 is preferably a simple sheet conductor (made of copper, gold or the like) which is fitted and shaped so as to lie flush with the surface of support nozzle 54. The length of cathode 58 may be adjusted to achieve optimum performance while the thickness thereof may be adjusted to control the lifetime thereof.

Figure 8:
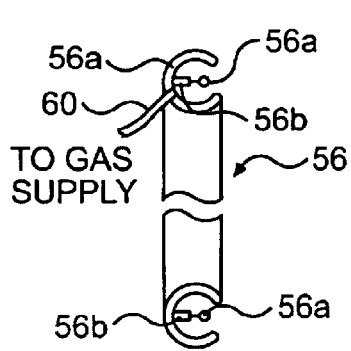
FIG. 8 is a side elevational view, partially in section, of a preferred embodiment of an anode assembly of the asymmetrical capacitor system of FIG. 7.

The anode assembly 54 preferably consists of a gas supply and distribution tube 56a of the annular shape shown in FIG. 8. Distribution tube 56a is preferably made of Kapton or another dielectric material and includes a plurality of posts 58b for supporting an annular fine wire conductor anode 58c. The location of the fine wire anode 58c within the cross-section of gas supply tube 58a can be varied to achieve optimum performance.

The anode 58c shown in FIG. 8 is similar to that of FIG. 2 but other constructions, including constructions similar to those of FIGS. 3 and 4, can also be employed. In the latter regard, the anode assembly can simply comprise a circular fine grid or mesh through which the gas is directed to produce a partially ionized gas flow.

The opening in the wire annulus of anode 58c can be adjusted to increase the anode corona and to achieve optimum performance.

Figure 9:
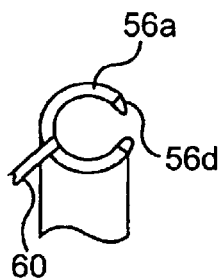
FIG. 9 is a side elevational view similar to FIG. 8, but further broken away and drawn to an enlarged scale, of a further preferred embodiment of the anode assembly.

In a similar, simplified embodiment shown in FIG. 9, an annular anode in the form of a wire element 58d having a sharp edge is mounted at the upper edge of the rear opening in the dielectric tube 58a. This approach allows the anode assembly to be simplified without loss of performance.

Figure 10:
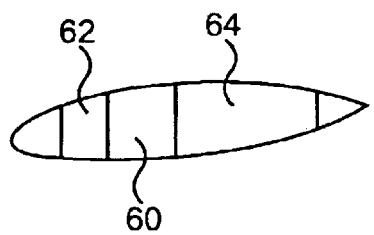
FIG. 10 is a side elevational view of a still further embodiment of the invention.

Referring to FIG. 10, a side elevational view is provided of an asymmetrical capacitor configuration for providing thrust augmentation of a helicopter rotor 60 (or other similar application in an airstream) wherein the asymmetrical capacitor formed by an anode 62 and a cathode 64 must overcome its own drag at subsonic speeds and then provide additional thrust. The normal cylindrical profile of previous embodiments may be suitably modified to provide low drag. In an alternative embodiment, the anode 62 may be formed by a wire ring mounted on dielectric posts as in other embodiments. It should be noted that although cylindrical configuration is presently preferred because it appears to be optimum from an efficient and arcing threshold viewpoint, other considerations in a specific application may dictate a different configuration, such as an oval or square configuration. Either of the two configurations should work well.

Figure 11:
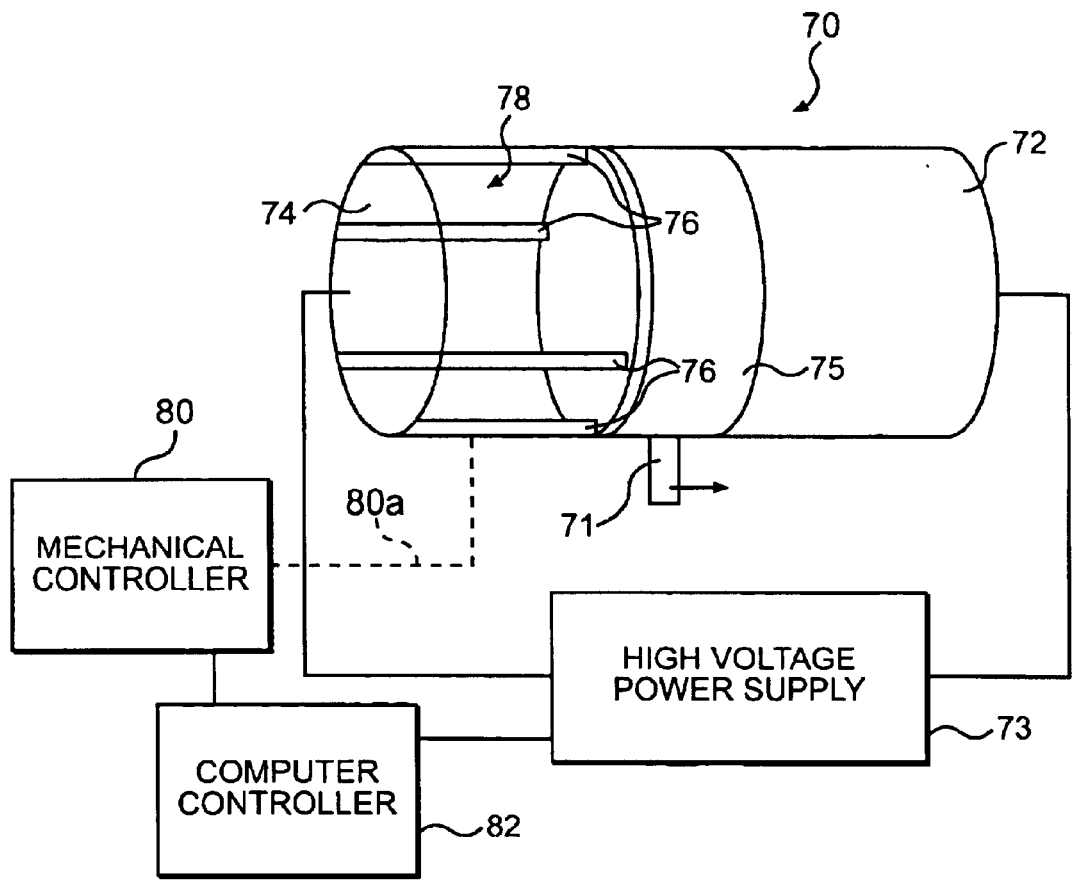
FIG. 11 is a perspective view of a further embodiment of the invention.

Referring to FIG. 11, yet another embodiment of the invention is shown. This embodiment is of general application and, in the specific embodiment illustrated no gas is supplied to the capacitor module, which is generally denoted 70. Similarly to some previously described embodiments, the module 70 includes a hollow cylinder 72 made of copper and some other highly conductive material forming one electrode (cathode), a fine wire ring 74 made of copper or other highly conductive material forming the other electrode (anode), a further cylindrical dielectric portion 75 located between cathode 72 and anode 74. A dielectric support rod 71 transfers force from the module 70 to an engine (not shown).

Anode ring 74 is mounted on dielectric posts 76 so as to create an arc gap 78 and in accordance with a key feature of this embodiment; the lengths of posts 76 are variable and, as indicated by dashed linking line 80a, are controlled by a mechanical controller 80. The latter is, in turn, controlled by a computer controller 82 which also controls a variable high voltage power supply 73 connected across anode 74 and cathode 72. Thus, computer controller 82 controls anode/cathode voltage and current as well as the separation between anode 74 and cathode 72. The lengths of posts 76 may be varied in a number of different ways including the provision of posts comprising telescoping elements which can be lengthened or shortened in length as desired under the control of mechanical controller 80. The latter may, for example, comprise an electromagnetic controller such as a solenoid control unit. Further, other approaches can be used in varying the relative spacing between the electrodes 72 and 74

Figure 12:
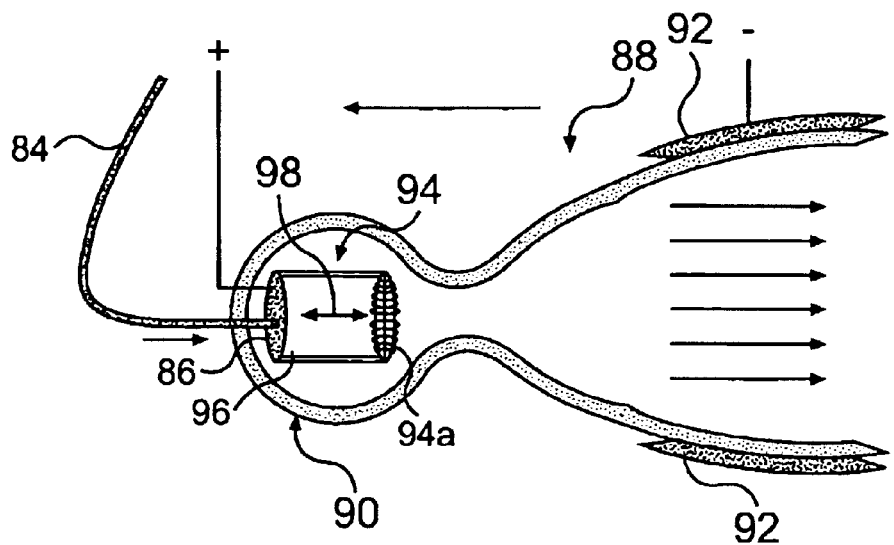
FIG. 12 is a side elevational view, partially in section, of yet another embodiment of the invention.

Referring to FIG. 12, still another embodiment of the invention is shown. This embodiment is of an enclosed anode hybrid thruster configuration similar to that of FIG. 7 and includes a gas input line 84 and gas distribution element 86. However, it should be understood that this embodiment is not limited to one which operates in a vacuum and in which gas is supplied as described above. In common with previous embodiments, the thruster module, which is denoted 88, includes a thruster or nozzle body 90, with a cathode 92 mounted thereon. The key difference between this embodiment and that of FIG. 7 is that the anode 94, which is shown in the form of a grid 94a, is variable in position so as to vary the relative spacing between anode grid 94a and cathode 92. To this end, anode 94 is mounted on gas distribution element 86 by variable length posts 96 so that, as represented schematically by double headed arrow 98, the position of anode grid 94a relative to element 86, and with respect to cathode 92, can be varied. The controls would be essentially the same of those of FIG. 11.

Although the invention has been described above in relation to preferred embodiments thereof, it will be understood by those skilled in the art that variations and modifications can be effected in these preferred embodiments without departing from the scope and spirit of the invention.

What is claimed is:

1. An asymmetrical capacitor system for creating a thrust in a vacuum, said system comprising:

a capacitor device comprising a first conductive element having a first geometry and forming a cathode; a second conductive element axially spaced from said first conductive element, having a geometry of smaller axial extent than said first conductive element and forming an anode; and a dielectric element disposed between said first conductive element and said second conductive element so as to form an asymmetrical capacitor having an anode end and a cathode end;

a high voltage source, having first and second terminals connected respectively to said first and second conductive elements, for applying a high voltage to said conductive elements of sufficient value to create a thrust force on said capacitor device inducing movement thereof;

a shroud surrounding at least said anode and having a closed end at least at said anode end of said asymmetrical capacitor; and a gas supply for supplying gas to said shroud at said anode end.

2. The system of claim 1 wherein said shroud is affixed to said capacitor device for movement therewith.

3. The system of claim 1 wherein the first conductive element comprises a hollow conductive barrel.

4. The system of claim 3 wherein said barrel comprises a metal sheet.

5. The system of claim 1 wherein the second conductive element comprises a fine conductive wire of an annular configuration.

6. The system of claim 5 further comprising a plurality of dielectric posts supporting said conductive wire.

7. The system of claim 6 wherein the second conductive element further comprises a plurality of diagonally extending wires extending between diametrically opposed points on said annular conductive wire and crossing at a central point to form a grid.

8. The system of claim 1 wherein said second conductive element comprises a wire mesh grid.

9. The system of claim 8 wherein said wire mesh grid is of a barrel-shaped geometry.

10. The system of claim 8 wherein said wire mesh grid is of a substantially flat geometry and has a circular perimeter.

11. The system of claim 1 wherein the dielectric element comprises an elongate dielectric barrel, and wherein said first and second conductive elements each comprise annular conductors disposed on said dielectric barrel in axially spaced relation.

12. The system of claim 11 wherein the second conductive element comprises a conductive mesh.

13. The system of claim 11 wherein the second conductive element comprises loops of fine wire.

14. The system of claim 11 wherein the second conductive element comprises a fine wire spiral.

15. The system of claim 11 wherein said dielectric barrel includes first and second axially spaced countersunk annular grooves in the outer surface thereof and said first and second conductive elements are disposed in said grooves.

16. The system of claim 15 wherein said first conductive element comprises a conductive sheet.

17. The system of claim 11 wherein opposite ends of said dielectric barrel extend beyond said first and second conductive elements.

18. The system of claim 1, wherein said system further comprises a plurality of circumferentially disposed, angularly spaced dielectric rods interconnecting the dielectric element and the second conductive element.

19. The system of claim 1 wherein said second conductive element comprises a plurality of concentric conductive elements forming a plurality of concentric anodes.

20. The system of claim 19 wherein said dielectric element comprises a plurality of concentric dielectric cylinders and said plurality of concentric anodes are respectively supported by said plurality of dielectric barrels.

21. The system of claim 1 wherein said system comprises a thruster including a nozzle, and wherein said dielectric element and said shroud comprise part of said nozzle.

22. The system of claim 21 wherein said nozzle includes a head portion, wherein the anode-forming second conductive element is disposed within said head portion and wherein said gas supply supplies gas to said head portion.

23. The system of claim 21 further comprising an annular gas distribution member for receiving and distributing said gas, said gas distribution member including a rear gas flow opening.

24. The system of claim 23 wherein the anode-forming second conductive element comprises an annular wire disposed with said annular gas distribution member and supported by at least one dielectric support post.

25. The system of claim 23 wherein the anode-forming second conductive element comprises an annular conductive element secured to said annular gas distribution member adjacent to said rear opening, said annular conductive element including a sharp edge.

26. An asymmetrical capacitor system for creating thrust, said system comprising:

an aerodynamically shaped member having a rounded leading edge and a tapered trailing edge and wherein at least an outer surface thereof comprises a dielectric, a capacitor device comprising a first conductive element disposed on the outer surface of said member and forming a cathode; a second conductive element disposed on the outer surface of said member in axially spaced relation to said first conductive element, having a geometry of smaller axial extent than said first conductive element and forming an anode whereby said first and second conductive elements together with said member form an asymmetrical capacitor; and a high voltage source, having first and second terminals connected respectively to said first and second conductive elements, for applying a high voltage to said conductive elements of sufficient value to create a thrust force on said capacitor device to thereby induce movement of said aerodynamically shaped member.

27. An asymmetrical capacitor system for creating thrust, said system comprising:

a capacitor device comprising a first conductive element having a first geometry and forming a cathode; a second conductive element axially spaced from said first conductive element, having a geometry of smaller axial extent than said first conductive element and forming an anode; and a dielectric element disposed between said first conductive element and said second conductive element so as to form an asymmetrical capacitor having an anode end and a cathode end;

a high voltage source, having first and second terminals connected respectively to said first and second conductive elements, for applying a high voltage to said conductive elements of sufficient value to create a thrust force on said capacitor device inducing movement thereof; and spacing adjustment means for mounting one of said anode and said cathode so that the axial spacing between said anode and cathode can be varied.

28. The system of claim 27 wherein said spacing adjustment means comprises a plurality of variable length posts on which said anode is mounted.

29. The system of claim 28 wherein said system is located in a vacuum and further comprises a shroud surrounding at least said anode and having a closed end at least at said anode end of said capacitor device; and a gas supply for supplying gas to said shroud at said anode end.

30. The system of claim 28 wherein the anode comprises a fine conductive wire of an annular configuration.

* * * * *